(12) United States Patent
Fischer

(10) Patent No.: US 8,422,749 B2
(45) Date of Patent: Apr. 16, 2013

(54) METHOD AND SYSTEM FOR MYOCARDIAL REGION OF INTEREST DEFINITION

(75) Inventor: Alexander Fischer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 690 days.

(21) Appl. No.: 12/305,500

(22) PCT Filed: Jun. 19, 2007

(86) PCT No.: PCT/US2007/071546
§ 371 (c)(1),
(2), (4) Date: Dec. 18, 2008

(87) PCT Pub. No.: WO2008/002797
PCT Pub. Date: Jan. 3, 2008

(65) Prior Publication Data
US 2009/0190810 A1    Jul. 30, 2009

Related U.S. Application Data

(60) Provisional application No. 60/805,782, filed on Jun. 26, 2006.

(51) Int. Cl.
*G06K 9/00* (2006.01)
*G06K 9/36* (2006.01)
*A61B 5/02* (2006.01)

(52) U.S. Cl.
USPC ............................ 382/128; 382/287; 600/481

(58) Field of Classification Search .......... 600/407–410, 600/416, 425, 436, 440, 481; 382/128, 130–132, 382/286, 287; 378/4–27
See application file for complete search history.

(56) References Cited

U.S. PATENT DOCUMENTS

| 5,421,331 | A | 6/1995 | Devito et al. |
| 5,431,161 | A * | 7/1995 | Ryals et al. ............... 600/425 |
| 7,853,304 | B2 * | 12/2010 | Bauman et al. ............. 600/407 |
| 2004/0052409 | A1 | 3/2004 | Bansal et al. |
| 2004/0127794 | A1 | 7/2004 | Murashita |

OTHER PUBLICATIONS

Swingen et al. Feedback-Assisted Three-Dimensional Reconstruction of the Left Ventricle with MRI, Journal of Magnetic Resonance Imaging 17:528-537.*

Cerqueira, et al., Standardized Myocardial Segmentation and Nomenclature for Tomographic Imaging of the Heart, Circulation AHA Scientific Statement, Jan. 29, 2002, pp. 539-542, http://www.circultionaha.org.

He et al., Reorientation of the Left Ventricular Long-Axis on Myocardial Transaxial Tomograms by a Linear Fitting Method, The Journal of Nuclear Medicine, Sep. 1991, pp. 1794-1800, vol. 32, No. 9.

Itti et al., Assessment of Myocardial Reperfusion After Myocardial Infarction Using Automatic 3-Dimensional Quantification and Template Matching, The Journal of Nuclear Medicine, Dec. 2004, pp. 1981-1988, vol. 45, No. 12.

(Continued)

*Primary Examiner* — Pascal M Bui Pho

(57) ABSTRACT

A method of identifying a myocardial region of interest in cardiac medical image data is disclosed. The method includes identifying myocardial tissue (200) in first (204) and second (206) views of the medical imaging data and constructing a myocardial surface (502). In one embodiment, the myocardial surface is modeled as a plurality of elliptical arc segments (502) and a half ellipsoid.

19 Claims, 3 Drawing Sheets

OTHER PUBLICATIONS

Katoh et al., Improvement of Algorithm for Quantification on Regional Myocardial Blood Flow Using 15 O-Water with PET, The Journal of Nuclear Medicine, Nov. 2004, pp. 1908-1916, vol. 45, No. 11.

Lin et al., Automated Quantification of *Myocardial ischemia* and Wall Motion Defects by Use of Cardiac SPECT Polar Mapping and 4-Dimensional Surface Rendering, Journal of Nuclear Medicine Technology, Mar. 2006, pp. 3-17, vol. 34, No. 1.

Nekolla, et al., Reproducibility of polar map generation and assessment of defect severity and extent assessment in myocardial perfusion imaging using positron emission tomography, European Journal of Nuclear Medicine, Sep. 1998, pp. 1313-1321, vol. 25, No. 9.

Bruno, R., et al.; An Interactive Tool to Visualize Three-Dimensional Ultrasound Data; 2000; Ultrasound in Med. & Biol.; 26(1)133-142.

Caiani, E. G., et al.; Improved semiautomated quantification of left ventricular volumes and ejection fraction using 3-dimensional echocardiography with a full matrix-array transducer: comparison with magnetic resonance imaging; 2005; J. of Amer. Soc. Echocardiography; 18(8)779-788.

Kuhl, H. P., et al.; High-resolution transthoracic real-time three-dimensional echocardiography; 2004; J. of the American College of Cardiology; 43(11)2083-2090.

Swingen, C. M., et al.; Feedback-assisted three-dimensional reconstruction of the left ventricle with MRI; 2003; J. of MRI; 17:528-537.

Young, A. A., et al.; Left ventricular mass and volume: fast calculation with guide-point modeling on MR images; 2000; Radiology; 216(2)597-602.

Corsi, C., et al.; Left Ventricular Volume Estimation for Real-Time Three-Dimensional Echocardiography; 2002; IEEE Transactions on Medical Imaging; 21(9)1202-1205.

Nakajo, H., et al.; Three-dimensional registration of myocardial perfusion SPECT and CT coronary angiography; 2005; Annals of Nuclear Medicine; 19(3)207-215.

Zhang, Q.; Registration of Medical Images and LV Long Axis Reorientation of Myocardial Radionuclide Tomographic Images; Mar. 15, 2004; Chinese Doctoral Dissertations and Masters' Theses Full-text Database (Master); No. 1., p. 53 and Figure 6.4. http://www.cmfd.cnki.net.

\* cited by examiner

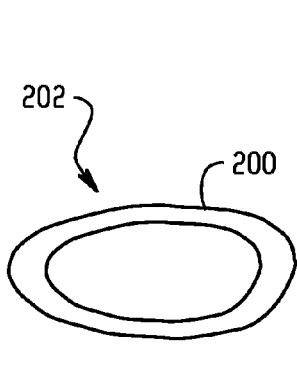 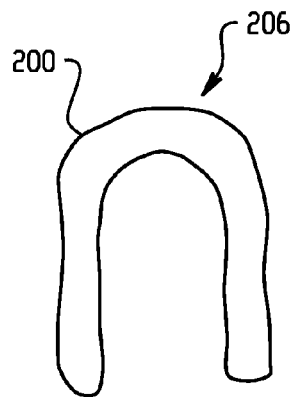 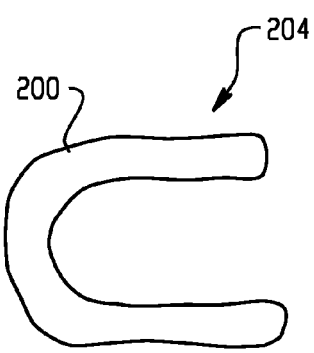
Fig. 2A   Fig. 2B   Fig. 2C
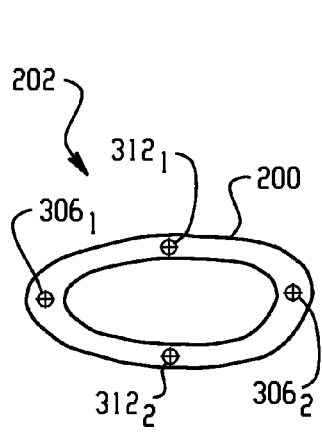 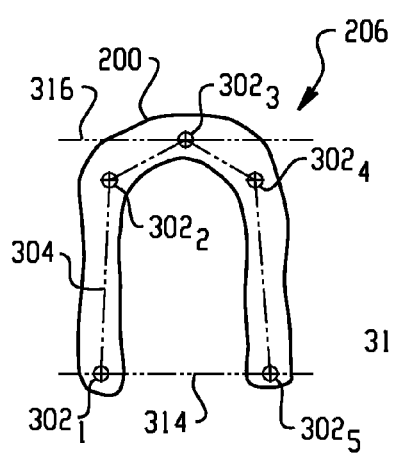 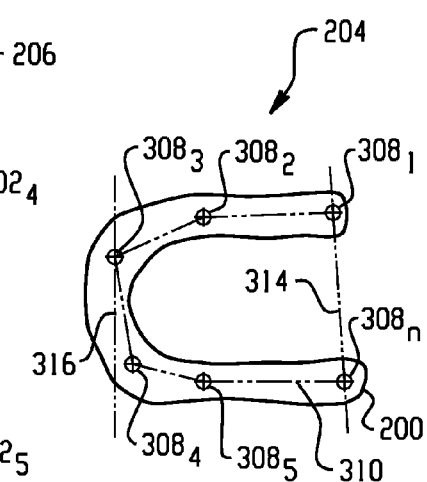
Fig. 3A   Fig. 3B   Fig. 3C
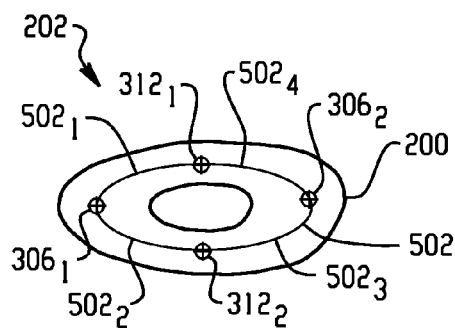 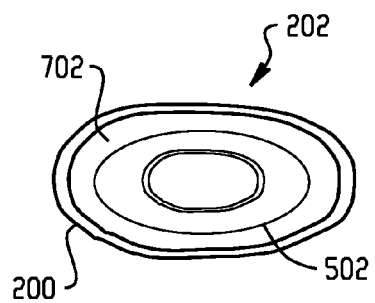
Fig. 5   Fig. 7

METHOD AND SYSTEM FOR MYOCARDIAL REGION OF INTEREST DEFINITION

CROSS REFERENCE TO RELATED APPLICATIONS

This application claims the benefit of U.S. provisional application Ser. No. 60/805,782 filed Jun. 26, 2006, which is incorporated herein by reference.

The present application relates to region of interest (ROI) definition in medical imaging, and more particularly to techniques for identifying the myocardial ROI in cardiac nuclear medicine data.

ROI definition in nuclear medicine can be a difficult task. Nuclear medicine image data generally exhibits a relatively high level of noise. Moreover, the image data typically include limited, if any, anatomical information.

One important application of ROI definition techniques is the identification of the myocardium in cardiac applications. In cardiac nuclear medicine, the activity distribution of an imaging agent in a volume in the vicinity of the heart is typically measured once (i.e., in a static study) or at a multiple time points (i.e., in a dynamic study). The data can in turn be used to estimate myocardial blood flow (MBF), regional myocardial blood flow (rMBF), flow reserve, ejection fraction, or other parameters which are relevant to a diagnosis or treatment. Quantitative assessment of these and other parameters have become widely accepted techniques for analyzing nuclear medicine data.

However, parameter estimation techniques typically require the identification of the myocardial ROI in the image data as a starting point for further processing. Indeed, accurate quantitative parametric assessment depends in part on an accurate and repeatable ROI definition. Consequently, various techniques for identifying a myocardial ROI have been proposed.

In one technique, the extent and boundaries of the myocardial ROI have been delineated manually by a human user for example by tracing the outline of the ROI or otherwise identifying the voxels contained in the ROI. Unfortunately, manual ROI delineation can be a laborious and time consuming task. This is especially true when it is necessary to delineate myocardial ROIs in corresponding stress and rest studies. Moreover, manual ROI delineation tends to be user dependent and prone to non-repeatability.

Another trend has been the adoption of multi-modality systems, in which a modality such as CT or MR which provides anatomical information is paired with a nuclear scanner. The anatomical information can in turn be used to identify the myocardium. However, the anatomic information may not be available or may be of relatively poor quality. Anatomical ROI definition techniques can also present their own set of issues.

Still other techniques which operate on the nuclear medicine data are disclosed in Nekolla, et al., *Reproducibility of polar map generation and assessment of defect severity and extend assessment in myocardial perfusion imaging using positron emission tomography*, Eur J Nucl Med, vol. 25, no. 9, pp. 1313-1321, September 1998; Katoh, et al., *Improvement of algorithm for quantification of regional myocardial blood flow using $^{15}O$-water with PET*, J Nucl Med, vol. 45, no. 11, pp. 1908-1916, November 2004; and Itti, et al., *Assessment of myocardial reperfusion after myocardial infarction using automatic 3-dimensional quantification and template matching*, J Nucl Med, vol. 45, no. 12, pp. 1981-1988, December 2004.

Nonetheless, there remains room for improvement. For example, ROI definition techniques which begin with a poorly defined starting condition can sometimes produce distinctly sub-optimal results, and correcting the problem can require considerable operator intervention. Thus, there remains a need for a relatively user-friendly, accurate, reproducible, and efficient myocardial ROI definition which is well suited for use with nuclear medicine data.

Aspects of the present application address these matters, and others.

In accordance with one aspect, a method includes identifying a first location of myocardial tissue in a first cardiac long axis view of nuclear medicine image data, determining an intersection of the first location and a second view of the image data, and using the determined intersection of the first location and the second view to generate a myocardial region of interest in the second view.

In accordance with another aspect of the invention, an apparatus includes means for identifying myocardial tissue at a first location in a first view of nuclear medicine image data, means for determining an intersection of the first location and a second view of the image data, and means for using the determined intersection of the first location and the second view to generate a myocardial region of interest in the second view.

In accordance with another aspect, a computer readable storage medium contains instructions which, when executed by a computer, cause the computer to carry out a method which includes displaying a first view of medical image data in a human readable form. The first view includes a region of the myocardium. The method also includes receiving a first human input identifying myocardial tissue at a plurality of locations in the first view, using the first received input to determine at least a first location of the myocardial tissue in each of a second plurality of views of the image data, and using the determined locations to generate a myocardial region of interest.

According to another aspect of the invention, a method includes identifying myocardial tissue at a plurality of spaced apart locations in a short axis view of cardiac image data, automatically generating a myocardial surface (502) which intersects the plurality of spaced apart locations, and repeating the steps of identifying and generating for a plurality of short axis views.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 1 depicts a method of identifying a myocardial ROI.

FIGS. 2A, 2B, and 2C are views of the myocardium.

FIGS. 3A, 3B, and 3C are views of the myocardium at various stages during the definition of a myocardial ROI.

FIG. 5 is a view of the myocardium showing a surface constructed using a first local model.

FIG. 7 is a view of the myocardium showing a myocardial ROI.

Figure 1:
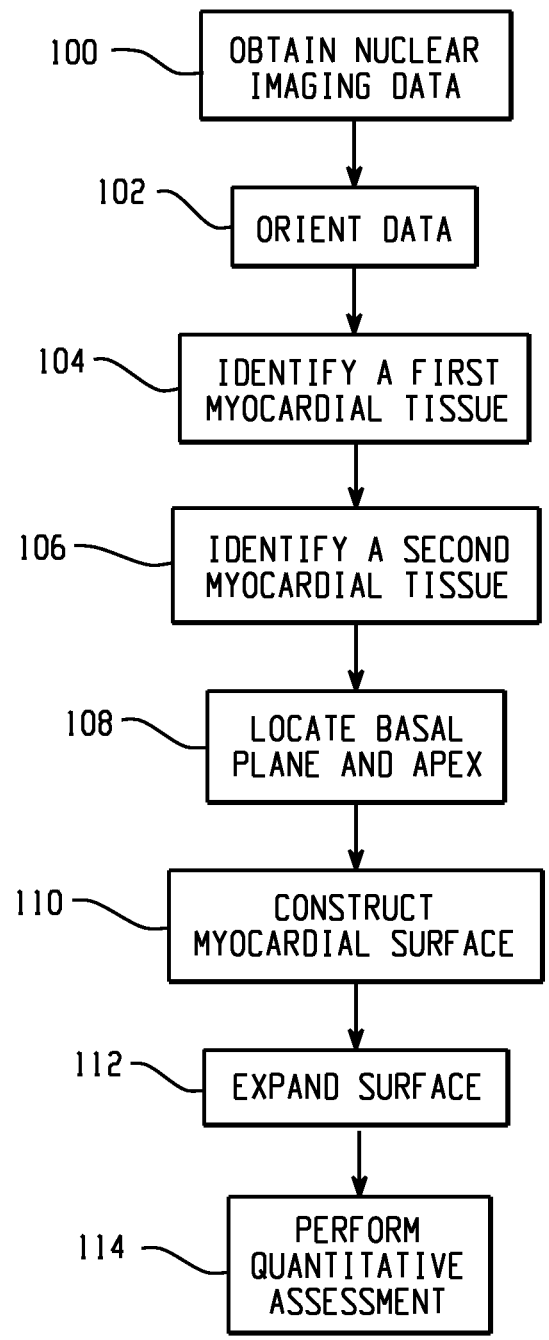

With reference to FIG. 1, a myocardial ROI definition method includes the steps of obtaining nuclear image data 100, orientating the data 102, identifying a first myocardial tissue 104, identifying a second myocardial tissue 106, locating the cardiac basal plane and apex 108, constructing a myocardial surface 110, expanding the surface 112, and performing a quantitative assessment 114.

Nuclear imaging data indicative of an object is obtained at step 100. The data may be generated from data collected using a single photon emission computed tomography (SPECT) scanner, a positron emission tomography (PET) scanner, or other suitable device. For the purposes of the present example, it will be assumed that nuclear imaging data includes volumetric data indicative of an ROI which includes a region of the heart. Note that the image data may be obtained from the scanner itself, a picture archiving or communications (PACS) system, a standalone computer, or other suitable source.

At step 102, and with additional reference to FIG. 2, volumetric data from the nuclear imaging examination is oriented relative to the long axis of the left ventricle to provide standard, mutually orthogonal short axis (SA) 202, horizontal long axis (HLA) 204, and vertical long axis (VLA) 206 cardiac views which include a region of the myocardium 200. The short axis view 202 is substantially orthogonal to the long axis of the left ventricle, while the horizontal long axis view 204 and the vertical long axis views 206 are substantially parallel to the long axis. The orientation can be performed using a suitable commercially available cardiac imaging software package. For purposes of the following example, it will be assumed that the short axis view 202 defines the x-y plane and that z increases from the cardiac apex to the basal plane. Other orientations may also be used, although the standard short axis 202, horizontal long axis 204, and vertical long axis 206 views have the benefit of being familiar to users and consistent with the geometry of the heart.

At step 104, and with reference to FIGS. 1 and 3, a first myocardial tissue identification step is performed using one of the long axis views 204, 206. Where the identification steps include a human input, slices depicting one or more of the oriented views 202, 204, 206 are displayed in human readable form, for example on the monitor or display of a computer having a graphical user interface (GUI). While the displayed slices need not be the center slices, slices nearer to the middle of the myocardium generally produce better results.

For the purpose of the present example, it will be assumed the identification is performed first on the vertical long axis view 206. In one implementation, the user is prompted to identify a desired plurality of points $302_1$, $302_2$, $302_3$, $302_4$, ... $302_n$ on the myocardial tissue. The points 302 are connected by a plurality of line segments 304, for example by performing a linear interpolation between successive points 302. Higher order interpolations may also be used to generate curved line segments 304. As can be seen, the points define a generally horseshoe shaped path which corresponds to shape of the myocardium 200 in the view 206.

Accuracy is enhanced where the number and location of the points are selected so that the line segments 304 are located near the center of the myocardial tissue. At the limit case, the points are sufficiently close together so that that the user effectively draws a curved line along the cardiac tissue in the displayed view.

The points 302 and line segments 304 may be displayed interactively to allow the user to review and adjust the one or more of the points and/or line segments as required. As a further aid to the myocardium identification, the points $306_1$, $306_2$ at which the respective segments 304 intersect the short axis view 202 may be interactively displayed on the short axis view 202.

At step 106, the myocardial tissue is identified on the second long axis view which, for the purpose of the present example, is assumed to be the horizontal long axis view 204. Again, the user is prompted to identify a plurality of points $308_1$, $308_2$, $308_3$, $308_4$, $308_5$ ... $308_n$ on the myocardial tissue, the points 308 are connected by a plurality of line segments 310, and the points $312_1$, $312_2$ at which the line segments intersect the short axis view are interactively displayed on the short axis view 202.

Ideally, the points 306, 312 are approximately centered in and relatively equally angularly spaced about the myocardial tissue in the short axis view 202. To this end, the user may be provided with the option to view and confirm the location of the intersection of the points 306, 312 with one or more additional slices and to repeat one or both of the tissue identification steps, perhaps using a different set of slices.

Note that one of the tissue identification steps 104, 106 may be omitted. Additional tissue identification steps may also be provided, for example by providing three or more long axis views. As another, one or more of the tissue identification steps may be performed automatically or semi-automatically.

At step 108, the results of the myocardial tissue identification steps are used to automatically determine the approximate locations of the cardiac basal plane 314 and apex 316. The locations may also be displayed and the user provided with an opportunity to confirm or adjust their locations as desired. In another implementation, the locations are identified manually by the user.

Figure 4:
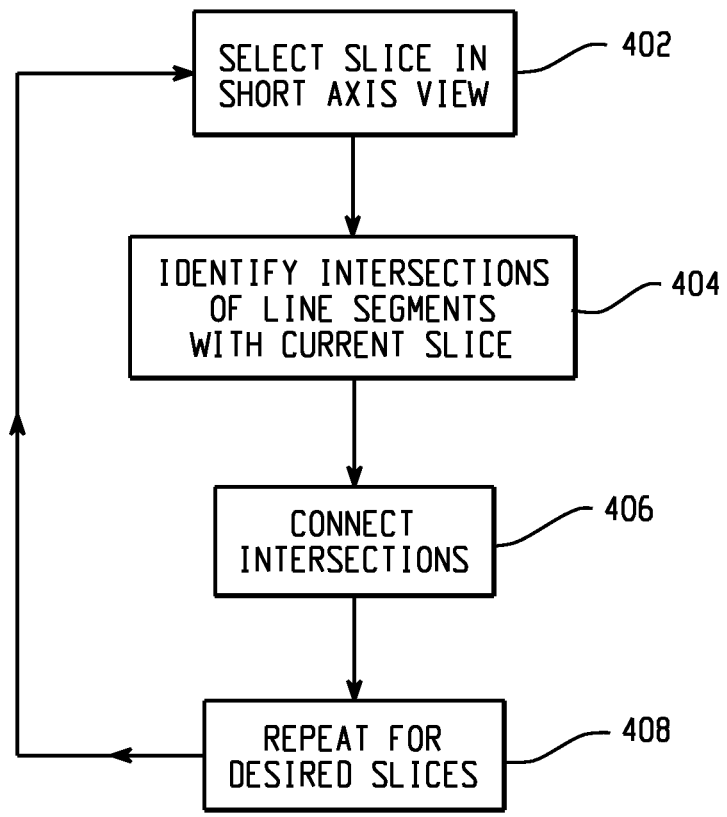

A myocardial tissue surface is automatically constructed at 110. With reference now to FIGS. 4 and 5, a slice in the short axis view 202 is selected at step 402. For the purpose of the following discussion, it is assumed that the initial slice is at or near the base. At step 404, the intersections $306_1$, $306_2$, $312_1$, $312_2$ of the line segments 304, 310 with the current slice are identified. More accurate results are obtained if the intersections 306 and the model(s) are selected so that the surface is constructed at or near the center of the myocardium.

At step 406, the adjacent intersections are connected. In one implementation, the connections are performed using a first local model which varies as a function of the z-axis location. For example, the surface 502 may be modeled by a series of quarter ellipses $502_1$, $502_2$, $502_3$, $502_4$. As the location of the intersection points $312_1$, $312_2$ becomes relatively less reliable at locations relatively nearer the apex (e.g., approximately the bottom ten percent (10%) of the full myocardial height), a different local model is used in the apical region. The slicewise procedure is discontinued, and the surface 502 is modeled as a half ellipsoid. The (x,y)-center of the ellipsoid is taken from the center of gravity of the surface constructed so far. The radii $r_x$ and $r_y$ are chosen to properly connect to the rest of the surface.

One advantage of modeling techniques is that the construction of the surface is generally less sensitive to regions of low activity. Other techniques may be used to construct the surface, either alone or in conjunction with local modeling. For example, the surface may be constructed by identifying regions of relatively high activity which are located between the various intersections, using anatomical data, or the like.

As shown at step 408, steps 402, 404, and 406 are repeated for a desired plurality of slices, for example moving from base to apex. Other orders are also contemplated.

Construction of the myocardial surface may be performed automatically without operator intervention. The surface may also be displayed at one or more points during the construction process and the user afforded an opportunity to view, modify, and/or accept the results. In one implementation, the completed surface is displayed in a three dimensional (3D) rendered view, either alone or co-registered with anatomic data.

Returning now to FIG. 1 and with additional reference to FIG. 7, the surface 502 is expanded at step 112 to generate the myocardial ROI 702. In one implementation, a region is deterministically added adjacent to the center surface. The thickness of the added region is a function of the geometry of the heart and the resolution of the volumetric data but independent of the measured activity; a thickness of about 5 millimeters (mm) is a suitable value. The surface may be further expanded to include additional voxels in the vicinity of the surface (e.g., within another 5 mm of the center surface) whose values exceed a desired value, for example about sixty percent (60%) of a data maximum. Other region growing techniques may also be employed.

Some or all of the surface expansion 112 may also be performed concurrently with the surface construction step 110; a surface 502 having a desired thickness may also be constructed without an explicit surface expansion step. In such an implementation, the surface 502 constructed during the surface construction step 110 can be viewed as having the desired thickness or otherwise encompassing some or all of the myocardial ROI 702.

A quantitative or other assessment of the myocardial ROI is performed at 114. The data may be used to generate perfusion maps, polar maps, or other study information which is presented in the desired format. Exemplary quantitative assessments include myocardial blood flow, regional myocardial blood flow, flow reserve, and ejection fraction.

Figure 6:
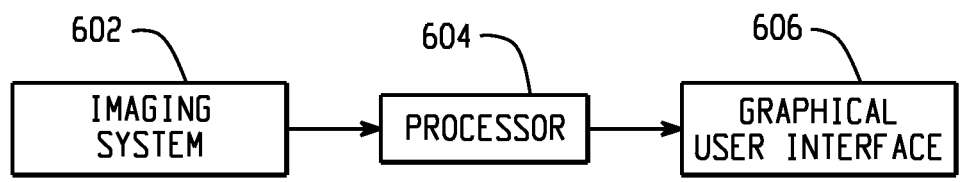
FIG. 6 depicts a system according to the present invention.

Turning now to FIG. 6, a system for carrying out an ROI definition includes an imaging system 602, a processor 604, and a user interface 606. While the foregoing discussion has focused on SPECT and PET systems, it will be appreciated that other suitable imaging systems may be used. The processor 604 is advantageously implemented as a computer or computer workstation. In this regard, it should be noted that the processor 604 may also provide some or all of the functionality of an operator console or workstation associated with the imaging system 602. The user interface 606 is advantageously implemented as a graphical user interface (GUI) using suitable human input/output devices such as a monitor or display, a keyboard, and/or a mouse.

The techniques described above may be tangibly embodied in computer programs stored in suitable computer readable storage media. The computer programs comprise instructions which, when read and executed by a processor, cause the processor to perform the steps necessary to execute the steps or elements of the present invention. Exemplary machine-readable memory storage media include, but are not limited to, fixed hard drives, optical discs, magnetic tapes, semiconductor memories, such as read-only memories (ROMs), random access memory (RAM) and programmable (PROMs). The memory containing the computer readable code is utilized by executing the code directly from the memory, or by copying the code from one memory storage device to another memory storage device, or by transmitting the code on a network for remote execution The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A method comprising:
    identifying, in a first cross-sectional cardiac long axis view of nuclear medicine image data containing a region which corresponds to myocardial tissue, a first location within the myocardial region of the first cardiac long axis view;
    determining an intersection of the first location and a second cross-sectional view of the image data; and
    using the determined intersection of the first location and the second cross-sectional view to generate a myocardial region of interest in the second cross-sectional view.

2. The method of claim 1 wherein the second cross-sectional view is substantially orthogonal to the first cardiac long axis view.

3. The method of claim 1 wherein the second cross-sectional view is a cardiac short axis view.

4. The method of claim 1, further comprising:
    identifying a second location of myocardial tissue in the myocardial region of the first cardiac long axis view;
    determining an intersection of the second location and the second cross-sectional view; and
    using the determined intersection of the second location and the second cross-sectional view to generate the myocardial region of interest in the second cross-sectional view.

5. The method of claim 4 wherein identifying the first location of myocardial tissue includes:
    displaying the first cardiac long axis view in a human readable form; and
    receiving a human input indicative of the first location of myocardial tissue.

6. The method of claim 1, further comprising:
    identifying a plurality of locations within the myocardial region of the first cardiac long axis view; and
    determining an intersection of the plurality of locations and a plurality of views of the image data, wherein the plurality of views are substantially orthogonal to the first cardiac long axis view.

7. The method of claim 1 further comprising using a mathematical model to generate a myocardial surface in the second cross-sectional view.

8. The method of claim 7 wherein using a mathematical model includes generating an elliptical arc.

9. The method of claim 7, further comprising:
    using a first mathematical model to generate a myocardial surface in a basal region of the myocardium and a second mathematical model to generate a myocardial surface in an apical region of the myocardium.

10. The method of claim 7 further including increasing a thickness of the myocardial surface.

11. A method comprising:
    identifying, in a first cardiac long axis view of nuclear medicine image data containing a region which corresponds to myocardial tissue, a first location within the myocardial region of the first cardiac long axis view;
    determining an intersection of the first location and a second view of the image data;
    using the determined intersection of the first location and the second view to generate a myocardial region of interest in the second view;
    identifying a second location of myocardial tissue in the myocardial region of the first cardiac long axis view;
    determining an intersection of the second location and the second view;
    using the determined intersection of the second location and the second view to generate the myocardial region of interest in the second view;
    identifying, in a second cardiac long axis view of the nuclear medicine image data containing a region which corresponds to myocardial tissue, a third location within the myocardial region of the second cardiac long axis view;

determining an intersection of the third location and the second view; and using the determined intersection of the third location and the second view to generate the myocardial region of interest in the second view.

12. The method of claim 11 wherein the generated myocardial region of interest in the second view is generally annular in shape.

13. An apparatus comprising:

means for identifying, in a first cross-sectional view of nuclear medicine image data containing a region which corresponds to myocardial tissue, a first location within the myocardial region of the first cross-sectional view;

means for determining an intersection of the first location and a second cross-sectional view of the image data; and means for using the determined intersection of the first location and the second view to generate a myocardial region of interest in the second cross-sectional view.

14. A non-transitory computer readable storage medium containing instructions which, when executed by a computer, cause the computer to carry out a method comprising:

displaying a first view of medical image data in a human readable form, wherein the first view includes a region of the myocardium;

receiving a first human input identifying myocardial tissue at a plurality of locations in the region of the myocardium in the first view;

using the first received input to determine at least a first location of the myocardial tissue in each of a second plurality of views of the medical image data;

using the determined locations to generate a myocardial region of interest;

displaying a third view of the medical image data in a human readable form, wherein the third view includes a region of the myocardium;

receiving a second human input identifying myocardial tissue at a plurality of locations in the region of the myocardium in the third view; and using the second received input to determine at least a second location of the myocardial tissue in each of the second plurality of views;

wherein using the determined locations to generate a myocardial region of interest includes using the first determined locations and the second determined locations.

15. The computer readable storage medium of claim 14 wherein using the first received input includes using the first received input to determine a third location of the myocardial tissue in each of the second plurality of views, wherein using the second received input includes using the second received input to determine a fourth location of the myocardial tissue in each of the second plurality of views, and wherein using the determined locations includes generating a surface which intersects the first, second, third, and fourth locations.

16. The computer readable storage medium of claim 15 wherein the surface includes a thickness greater than or equal to about 5 mm.

17. The computer readable storage medium of claim 14 wherein the first view is a horizontal long axis view, the second plurality of views includes a short axis view, and the third view is a vertical long axis view.

18. A method for generating a myocardial region of interest, the method comprising:

identifying, in a short axis view of cardiac image data containing a region which corresponds to myocardial tissue, a plurality of spaced apart locations within the myocardial region of the short axis view;

automatically generating a myocardial surface in the short axis view which intersects the plurality of spaced apart locations;

repeating the steps of identifying and generating for a plurality of short axis views; and using the myocardial surfaces to generate the myocardial region of interest;

wherein identifying myocardial tissue at a plurality of locations in the short axis view comprises firstly identifying myocardial tissue in first and second long axis views of the cardiac image data, and then secondly determining the plurality of locations in the short axis view by using the identified myocardial tissue in the first and second long axis views.

19. The method of claim 18 wherein the automatically generating includes selecting a local model as a function of a location of the short axis view along a long ventricular axis and using the selected local model to generate the myocardial surface.

* * * * *